C. SCHOENERT.
LOCK WASHER.
APPLICATION FILED OCT. 25, 1920.
1,393,910.  Patented Oct. 18, 1921.
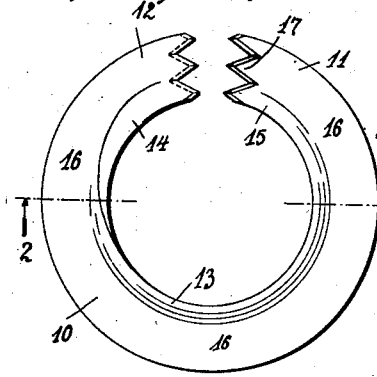
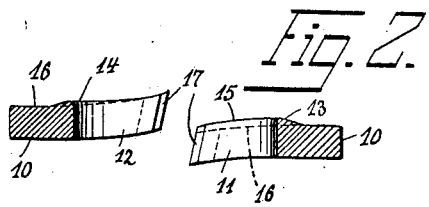
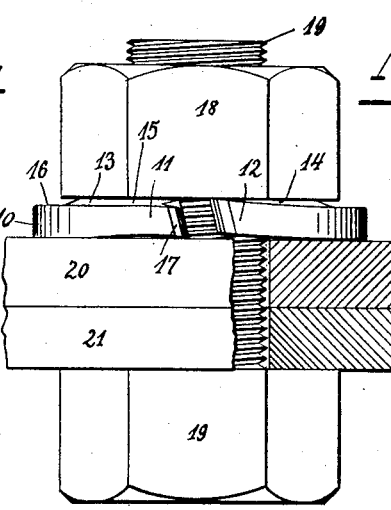
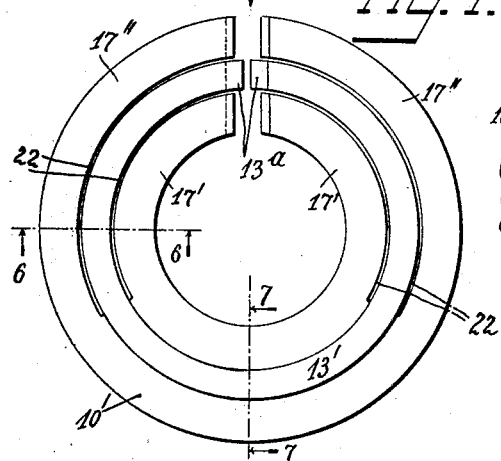
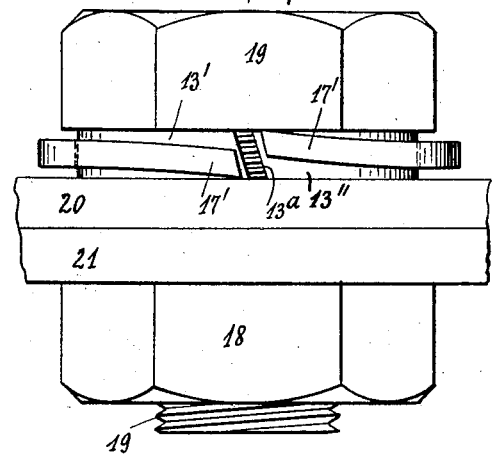
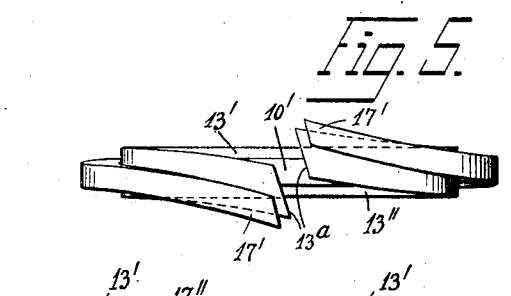
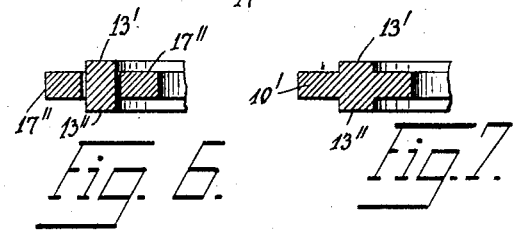
INVENTOR.
Carl Schoenert
BY
ATTORNEY.

UNITED STATES PATENT OFFICE.

CARL SCHOENERT, OF NEWARK, NEW JERSEY.

LOCK-WASHER.

1,393,910.

Specification of Letters Patent.  Patented Oct. 18, 1921.

Application filed October 25, 1920. Serial No. 419,162.

*To all whom it may concern:*

Be it known that I, CARL SCHOENERT, a citizen of the United States of America, residing at Newark, in the county of Essex and State of New Jersey, have invented certain new and useful Improvements in Lock-Washers, of which the following is a specification.

My invention relates to washers for securing bolts, nuts, and other parts of machinery or of structures against turning. The improved lock washer is very simple, yet of greatly superior strength and efficiency. The washer is of the split or open type, and its ends are given a peculiar novel formation by which the improved results mentioned above are obtained.

Reference is to be had to the accompanying drawings, which illustrate two typical forms of my invention, and in which Figure 1 is a plan view showing one form of my improved washer; Fig. 2 is a cross section on line 2—2 of Fig. 1; Fig. 3 shows this washer in conjunction with a bolt and a nut; Fig. 4 is a plan view showing another form of my washer; Fig. 5 is a side view thereof in the direction of the arrow 5 in Fig. 4; Figs. 6 and 7 are cross sections on lines 6—6 and 7—7 respectively of Fig. 4; and Fig. 8 is an elevation of the washer represented in Figs. 4 to 7, in conjunction with a bolt and a nut.

The washer shown in Figs. 1, 2 and 3 comprises an almost annular body 10 preferably of rectangular cross section (Fig. 2), the ends 11, 12 being bent or inclined in opposite directions. On one side of said body, along the inner edge thereof, is located a circumferential projection or ridge 13 which like the entire washer is of a slightly helical character when the washer is not under tension; one end 14 of said ridge decreases in thickness gradually toward the extremity of the end 12, and the remaining portion of the ridge has a surface 15 substantially parallel to the adjacent portion of the body surface 16 from which said ridge is projected. The transverse edges of the ends 11 and 12 are serrated or toothed, as indicated at 17, three teeth being shown in Fig. 1. These teeth are inclined or oblique in the same direction, and in such a way that each tooth will have an acute-angled edge on that side of the body where the tooth is adapted to engage the surface against which the washer is applied; that is to say, the teeth of the end 11 have their acute-angled edges on the side or surface opposite to the ridge 13, while the acute-angled edges of the teeth 17 on the end 12 are adjacent to the surface 16 from which the ridge 13 is projected. With this oblique arrangement I obtain much better results than if the sides or flanks of the teeth 17 were perpendicular to the (mainly plane) opposite faces of the body 10, or in other words, if such flanks were vertical when the washer is in a horizontal position.

Fig. 3 illustrates one way of using a washer of the construction shown in Figs. 1 and 2, to secure a nut 18 which in conjunction with a threaded bolt 19, serves to hold together two members 20 and 21. As the nut 18 is screwed on and approaches the member 20, the washer interposed between said parts will be compressed until the flat face 14, 15 of the ridge 13 is in engagement with one of said parts (say, the nut 18), as shown in Fig. 3. The teeth 17 will have their acute-angled edges in firm contact with the member 20 and with the nut 18 respectively, the inclination or obliquity of said teeth being in the proper direction to allow the nut to be screwed on, but to oppose its unscrewing. For this purpose, assuming the ordinary right-hand screw thread, the inclination of the teeth should be similar to that of a left-hand helix, that is to say downwardly from left to right, looking at the outside of the washer when the latter is held horizontal. Likewise, for use in conjunction with right-hand screw threads, the ends 11, 12 should be bent in such a manner that when viewing the washer as just referred to, the right-hand end will be bent up, and the left-hand end down, each end being therefore inclined in the same direction as the respective teeth 17, but at a smaller angle. Washers intended for left-hand threads would have their ends bent in the direction opposite to that shown, and likewise the obliquity or inclination of their teeth would be the opposite of that illustrated. The acute-angled edges of the teeth 17 will dig into the opposing surfaces of the nut 18 and of the member 20 in case it is attempted to unscrew the nut, and the resistance will increase with the force applied, so that any accidental loosening of the nut will be prevented. If for any reason it is desired to remove the nut, a screw-driver or similar tool may be introduced into the space, between the nut 18 and the surface 16, adjacent to the end 12 (right-hand portion of Fig. 3), and by working this tool toward the extremity of the said end 12, the latter will be wedged or pried downwardly to release the nut from the teeth 17 of said end.

In Figs. 4 to 8 I have illustrated another form of my invention. Here the substantially annular body 10′ is provided on opposite faces with circumferential central ridges 13′, 13″ respectively, their ends extending upwardly and downwardly at an inclination when the washer is unconfined, in the same manner as described with reference to the end portions 11 and 12, and the transverse ends 13$^a$ of said body and ridges are inclined in the same way as described with reference to the flanks of the teeth 17. The ridges 13′, 13″ are continuous with the body 10′ along an arc of, say, 120°, but along the remainder of their extent, these ridges are separated by arcuate slots 22 from curved elastic members 17′ and 17″ respectively, bent and beveled at their free ends in the same manner as described above in connection with the ends 11, 12 and with the teeth 17 respectively. The individual inner and outer members 17′ and 17″ when bent as shown appear to be slightly shorter than the ridges 13′, 13″, the ends 13$^a$ being closer together than the beveled ends of opposite members or teeth, 17′, 17″. These members are bent upwardly and downwardly to project beyond the bent ends 13$^a$, when the washer is unconfined, as shown in Fig. 5. Each member 17′ or 17″ is movable independently, within certain limits, relatively to the body of the washer.

When a washer such as illustrated by Figs. 4 to 7 is used, say in the manner shown in Fig. 8, the bent ends 13$^a$ are moved toward each other into an alining condition, so that the ridges 13′, 13″ will have plane faces in engagement with the two parts between which the washer is used, for instance the member 20 and the head of the bolt 19. The action of the three teeth at each end will be substantially the same as described above, with the additional efficiency secured by the individual mobility of the elastic members 17′, 17″.

Various modifications may be made without departing from the nature of my invention as set forth in the appended claims.

I claim:

1. A split lock washer having at each of its ends, a plurality of teeth located at different distances from the center of the washer, all the teeth of one of said ends being bent in the same direction, and all the teeth of the other end being bent in the opposite direction.

2. A split lock washer having at each of its ends, a plurality of teeth located at different distances from the center of the washer, all the teeth of one of said ends being bent in the same direction, and all the teeth of the other end being bent in the opposite direction, the teeth of both ends having acute-angled edges on those sides toward which the respective teeth are bent.

3. A split lock washer the ends of which are bent in opposite directions and provided with a plurality of circumferentially-extending teeth, said washer having on one face a circumferential ridge the thickness of which decreases gradually at one end of the washer.

4. A split lock washer having a body provided with central circumferential ridges on each of its faces, and with elastic inner and outer tooth members at each side of said ridges.

In testimony whereof I have affixed my signature.

CARL SCHOENERT.